United States Patent Office 3,634,399
Patented Jan. 11, 1972

3,634,399
WATER-SOLUBLE LATENT CROSS-LINKING AGENTS
Anthony Thomas Coscia, South Norwalk, Conn., and Joseph Hansbro Ross, South Bend, Ind., assignors to American Cyanamid Company, Stamford, Conn.
No Drawing. Application June 10, 1966, Ser. No. 556,574, now Patent No. 3,494,775, dated Feb. 10, 1970, which is a continuation-in-part of application Ser. No. 270,533, Apr. 4, 1963. Divided and this application Aug. 5, 1969, Ser. No. 847,738
Int. Cl. C07d 25/00
U.S. Cl. 260—239 A      3 Claims

ABSTRACT OF THE DISCLOSURE

The 1-lower alkyl (and 1-lower hydroxyalkyl)-1-(3-chloro-2-hydroxypropyl)-3-hydroxyazetidinium chlorides are monofunctional and compatible with water-soluble proteins at normal storage temperatures, but act as bifunctional cross-linking agents at elevated temperatures.

---

This is a division of our continuation-in-part application Ser. No. 556,574, filed June 10, 1966, now U.S. Pat. No. 3,494,775, which is a continuation-in-part of our copending application Ser. No. 270,533 filed on Apr. 4, 1963 (now abandoned).

The present invention relates to water-soluble temperature-activable latent cross-linking agents the proteins and to certain azetidinium salts (and oligomers thereof) useful therefor.

At the present time coated paper (with and without pigment) is manufactured by continuously applying an aqueous solution of a film-forming protein and a latent insolubilizing therefor to a travelling paper web (commonly called "coating raw stock"). A coating forms when the web is dried, and sufficient time must be allowed to permit the insolubilizing agent to react with the protein. Paper can be coated at high speed, and the time required for the insolubilizing reaction to occur is generally the limiting operation on the process.

The insolubilizing agents which are commonly employed as insolubilizing agents are formaldehyde and aminoformaldehyde or phenol-formaldehyde resins. Compositions containing formaldehyde, however, are commonly slow to react and hence a residue may be present in the finished paper. As a result, the paper may evolve the pungent odor of formaldehyde and may be of limited utility since formaldehyde vapors are intensely irritating to the mucous membranes of the throat and to the eyes. A demand has consequently arisen for a quick-reacting latent insolubilzing agent for protein which is free from formaldehyde.

The discovery has now been made that the azetidinium salts of the formula

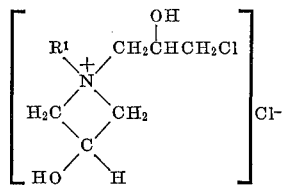

wherein R represents a $C_{1-3}$ alkyl or hydroxyalkyl substituent are extremely effective as thermally activable latent catalysts for protein adhesives in aqueous paper coating compositions. We have found that in preferred embodiments they possess the following advantages:

(1) They produce their insolubility effect rapidly, in less than a minute at customary temperatures.

(2) They contain no formaldehyde and are odorless.

(3) They exert their insolubilizing action at an alkaline pH (at which formaldehyde reacts slowly). They do not present a serious corrosion problem to metals or an acid tending problem to cellulose substrates.

(4) When added to paper coating compositions containing clay as pigment (and containing protein as the adhesive), the resulting compositions possess an uncommonly low viscosity.

(5) They possess different functionalities under different conditions. Under normal storage conditions (70° F.) they behave monofunctionally and are compatible with proteins in aqueous medium. At elevated temperatures they develop two functionalities and then act as cross-linking agents for proteins.

The azetidinium compounds of the present invention are prepared by slowly adding epichlorohydrin to a solution of one or more $C_{1-3}$ monoprimary alkyl or hydroxy amines with vigorous stirring in a mutual solvent which acts as a heat sink and reaction moderator, and employing sufficient cooling to cause the reaction to proceed at a slow rate. Water alone or water-alcohol mixtures are suitable solvents. In the laboratory we have found it advantageous to perform the reaction in the temperature range of 32°–42° C.

The reaction is stopped after two mols of the epihalohydrin have reacted with the amine, preferably when the product is monomeric or dimeric, and in any event before the product attains an average molecular weight of about 5,000.

The amount of epichlorohydrin which reacts can be followed by analyzing for ionic chlorine. The molecular weight of the aforesaid products are determined by the vapor pressure osmometry method.

The reaction is substantially complete when two mols of epichlorohydrin have been added and when the exotherm has ceased. The solutions containing the azetidinium compounds are normally clear and odorless. The compounds can be recovered as white solids by freeze drying.

The temperature at which the azetidinium compounds of the present invention change from monofunctional to bifunctional state in aqueous medium has not been ascertained. The evidence, however, is that at 70° F. the compounds are predominantly if not entirely in monofunctional state and that the compounds are predominantly if not entirely in bifunctional state at 250° F.

The invention is more particularly illustrated by the examples which follow. These examples are preferred embodiments of the invention and are not to be construed as limitations thereon.

EXAMPLE 1

The following illustrates the preparation of 1-(3-chloro-2-hydroxy)-3-hydroxy-1-methylazetidinium chloride.

To 31 g. (1 mol) of methylamine in 47 g. of water is slowly added 185 g. (2 mols) of epichlorohydrin with rapid stirring and sufficient cooling to maintain this temperature of the reaction mixture below 50° C. (at about 40° C.). When the exotherm subsides, the clear light yellow solution is diluted to 70% with water. The product has the theoretical structure.

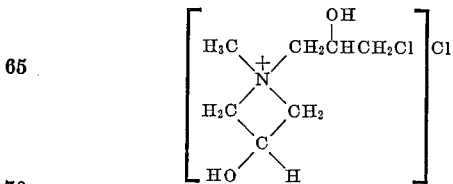

The salt is recovered as a solid when a sample of the solution is freeze-dried to a water content of 1% by weight. A sample of the solid dissolved in water has a molecular weight of 123 (theory 108), indicating that it is substantially monomeric.

A similar product is obtained when the methylamine is added as a 40% by weight solution in water to the appropriate amount of epichlorohydrin containing sufficient water to produce a 70% by weight solution of the azetidinium compound.

EXAMPLE 2

The procedure of Example 1 is repeated, except that the methylamine is replaced by 59 g. (1 mol) of isopropylamine. The product is 1-(3-chloro-2-hydroxypropyl)-3-hydroxyl-1-isopropylazetidinium chloride.

EXAMPLE 3

The procedure of Example 1 is repeated except that the methylamine is replaced by 61 g. (1 mol) of ethanolamine. The product is 1-(3-chloro-2-hydroxypropyl)-3-hydroxy-1-hydroxyethylazetidinium chloride.

EXAMPLE 4

The following illustrates the utilization of the compounds of the present invention as latent insolubilizing agents in paper coating compositions containing a water-soluble film-forming protein.

Into 619 g. of water is stirred first 126 g. of casein (90% solids), and then 15 g. of 29% ammonium hydroxide. The mixture is heated at 55° C. with continued stirring until the casein is completely dissolved; about 20 minutes are required. The water lost by evaporation is replaced. The solution has a pH of 9.0–9.2 and contains about 15% by weight of casein (dry basis).

333 g. of the 15% casein solution is added with stirring to a dispersion of 503 g. of paper-coating clay in 323 cc. of water containing 1 g. of sodium tetraphosphate and 1 g. of sodium carbonate. This is mixed for 1 hour and 82 cc. of water finally added. The slurry contains 48% total solids by weight, and the weight of the clay is 10 times the weight of the casein. To 100 g. of this slurry is added with stirring a sufficient quantity of the 70% solutions of Example 1 to supply in each instance 10% of the azetidinium compound based on the weight of the casein. One aliquot is reserved as control, and to this none of the azetidinium compound is added. The pH of the control suspension is about 9.

The two compositions are applied at a coating weight of 15 lb. per 25" x 36"/500 ream to coating raw stock sheets by use of a 0.0005" knife applicator. The sheets are dried at room temperature and oven-cured at 300° F. for one minute, and then calendered. The sheets are tested for their wet-rub resistance by a standard laboratory method wherein the test sheet after being conditioned at room temperature is placed on a black sheet and rubbed with a rubber-covered thumb moistened with 0.02% aqueous sodium hydroxide solution so as to transfer any of the coating which may be removed by the thumb to the underlying black sheet. On a scale of 10 in which 0 designates rapid and extensive removal of the coating, 10 designates no removal of the coating, and intermediate values designate proportional amounts removed, the composition containing the azetidinium insolubilizing agent is rated 9. The control is rated 2.

The composition containing the azetidinium insolubilizing agent is stable for at least a month at 70° F.

EXAMPLE 5

The following illustrates a coating composition wherein the azetidinium compound is partially pre-reacted or "cooked" with the casein.

A composition is prepared according to Example 1, except that the azetidinium compound is cooked for 5 minutes with the casein at 55° C. and the reaction product is then added to the clay dispersion.

This composition becomes water-insoluble when coated on paper and the paper is heated for 1 minute in an oven at 220° F. The resulting paper has a wet-rub test value of 6. After one minute of addition heating in an oven at 300° F., the coating has a wet-rub resistance of 9–10.

Had the condensation product not been previously cooked with the casein, the paper after drying for 1 minute at 220° F. would have had a wet-rub value of only 2–3.

EXAMPLE 6

The following illustrates the utility of the azetidinium compounds of the present invention is insolubilizing agents in protein-containing topcoats on various surfaces.

A coating composition is prepared by taking an aliquot from the aqueous casein solution (pH 9.2) of Example 1, adding thereto 10% (based on the weight of the casein therein) of the azetidinium condensate of Example 1, and diluting the mixture to 10% solids by addition of water. The resulting clear viscous solution is applied to polyalkylene films, to glass and, in pigmented state (containing 6.6 parts of $TiO_2$ per part of casein), to building boards as shown in the table below, by means of Bird applicators of the size shown. The coated specimens are laid horizontally and are dried in a laboratory oven at the temperatures and for the times shown. The resistance of the coat to water is measured by applying drops of water to the coating, allowing the drops to remain on the surface for 30 seconds, and then firmly rubbing the thumb across the surface four times. A rating of "good" means that virtually none of the coating is removed, and that the coating is not marred by the thumb. The rating of "poor" means that the coating possesses substantially no water-resistance.

| Run | Substrate | Bird applic. size, in. | Dried Temp., °C. | Mins. | Wet rub test |
|---|---|---|---|---|---|
| 1 | Polyethylene, pigmented | 0.0005 | 95 | 10 | Good. |
| 2 | Polypropylene, oxidized | 0.0005 | 95 | 10 | Do. |
| 3 | Glass | 0.0015 | 150 | 2 | Do. |
| 4 | Wood particle board | 0.0015 | 150 | 5 | Do. |
| 5 | Plaster board | 0.0015 | 150 | 5 | Do. |
| 6 | Wood fiber ceiling tile board. | 0.0015 | 150 | 5 | Do. |
| 7 | Mineral fiber ceiling tile board. | 0.0015 | 150 | 5 | Do. |

Results are "poor" when the amine-epichlorohydrin condensate is omitted.

EXAMPLE 7

A 10% by weight solution of gelatin in water is divided into two parts. One is left untreated, as control. To the other is added 20% (based on the weight of the gelatin) of the azetidinium compound of Example 1. A film of each of the resulting solutions is drawn down on a glass plate by use of a 0.0015" orifice Bird applicator.

The coatings are allowed to dry at 20° C., at which point the coatings possess "poor" water-resistance.

The plates are then placed for 5 minutes in an oven at 150° C. Both coatings on the plates are then clear. The water-resistance of the control film is "poor" but the water-resistance of the test film is "good" as determined by the method of Example 3.

EXAMPLE 8

The following illustrates the comparative storage stability of a protein composition according to the present invention containing a low molecular weight azetidinum compound as latent insolubilizing agent.

Two coating compositions are prepared by the method of Example 1, the only difference being that in one instance the latent insolubilizing agent is the azetidinium compound of Example 1, and in the other instance the latent insolubilizing agent is tri(methoxymethyl)melamine.

The viscosities of the two compositions are determined initially, and again after storage for 24 hours at 20° C. Results are as follows.

| Latent insolubilizing agent | Viscosity, cp. | | |
|---|---|---|---|
| | Initial | After 24 hr. | Percent increase |
| Azetidinium compound | 1,356 | 1,491 | 10 |
| Tri(methoxymethyl) melamine | 2,240 | 4,480 | 100 |

The composition containing the azetidinum compound is much more stable than the composition containing the melamine compound.

EXAMPLE 8

The following illustrates the preparation and properties of a pigmented composition according to the present invention, wherein the protein is soya (alpha) protein and the pigment is clay.

The composition is prepared by first partially reacting the soya protein with the azetidinium compound of Example 1 by heating an aqueous solution of the two at 130° F. for 15 minutes, and mixing the product with a fluid aqueous dispersion of a paper-coating clay, prepared as described in Example 2, the proportions of materials being employed in such proportions that the weight of the insolubilizing agent is 10% on the weight of the protein, the weight of the protein is 10% of the weight of the clay, and the final composition contains 48% solids by weight. The final composition is stirred for 1 hour to ensure complete wetting of the clay particles with the aqueous phase.

The composition having a pH of 8.8 and a Brookfield viscosity at 100 r.p.m. is applied to coating raw stock at the rate of 14.0 lb. per and a sample of the paper is oven-dried for 1 minute at 300° F. The coatings are tested by the method of Example 1, and has a rating of 9, which shows that excellent wet rub-resistance is obtained when the composition is dried for a time and at a temperature in common use in the paper coating art.

We claim:

1. A water-soluble condensation product selected from the group of compounds of the theoretical formula

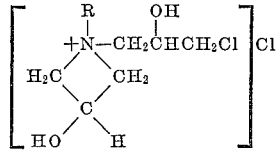

wherein R is a lower alkyl or lower hydroxyalkyl substituent containing not more than 3 carbon atoms and water-soluble oligomers thereof having a molecular weight less than 5,000.

2. A condensation product according to claim 1 wherein R is methyl.

3. A condensation product according to claim 1 wherein R is 2-hydroxyethyl.

No references cited.

ALTON D. ROLLINS, Primary Examiner

U.S. Cl. X.R.

260—2 BP